United States Patent
Miller et al.

(10) Patent No.: US 9,723,861 B2
(45) Date of Patent: *Aug. 8, 2017

(54) METHOD OF FEEDING YOUNG MONOGASTRIC MAMMALS

(71) Applicant: PURINA ANIMAL NUTRITION LLC, Shoreview, MN (US)

(72) Inventors: Bill L. Miller, Labadie, MO (US); Edwin L. Stephas, Eagle Grove, IA (US)

(73) Assignee: PURINA ANIMAL NUTRITION LLC, Shoreview, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,880

(22) Filed: Jul. 15, 2016

(65) Prior Publication Data

US 2016/0324191 A1    Nov. 10, 2016

Related U.S. Application Data

(63) Continuation of application No. 11/731,917, filed on Apr. 2, 2007, now Pat. No. 9,420,807.

(51) Int. Cl.
| | |
|---|---|
| *A23K 50/60* | (2016.01) |
| *A23K 10/30* | (2016.01) |
| *A23K 20/163* | (2016.01) |
| *A23K 20/10* | (2016.01) |
| *A23K 50/00* | (2016.01) |
| *A23K 50/30* | (2016.01) |
| *A23K 50/20* | (2016.01) |

(52) U.S. Cl.
CPC .............. *A23K 50/60* (2016.05); *A23K 10/30* (2016.05); *A23K 20/10* (2016.05); *A23K 20/163* (2016.05); *A23K 50/00* (2016.05); *A23K 50/20* (2016.05); *A23K 50/30* (2016.05); *A23V 2002/00* (2013.01)

(58) Field of Classification Search
CPC ......... A23K 1/14; A23K 1/1833; A23K 50/60
See application file for complete search history.

(56) References Cited

U.S. PATENT DOCUMENTS

| | | | |
|---|---|---|---|
| 3,708,306 | A | 1/1973 | Appleman |
| 4,614,653 | A | 9/1986 | Kakade |
| RE32,811 | E | 12/1988 | Rudin |
| 4,839,171 | A | 6/1989 | Nelson |
| 4,867,998 | A | 9/1989 | Ralvert |
| 5,038,396 | A | 8/1991 | Gjerlov |
| 5,429,828 | A | 7/1995 | Fodge et al. |
| 5,569,466 | A | 10/1996 | Tanner |
| 5,571,542 | A | 11/1996 | Miller et al. |
| 5,614,501 | A | 3/1997 | Richards |
| 5,851,573 | A | 12/1998 | Lepine et al. |
| 5,932,258 | A | 8/1999 | Sunvold |
| 5,958,898 | A | 9/1999 | Hayek et al. |
| 5,965,175 | A | 10/1999 | Reinhart et al. |
| 6,066,341 | A | 5/2000 | Wilson |
| 6,162,473 | A | 12/2000 | Fodge et al. |
| 6,180,131 | B1 | 1/2001 | Sunvold et al. |
| 6,210,722 | B1 | 4/2001 | Wullschleger et al. |
| 6,221,421 | B1 | 4/2001 | Wullschleger et al. |
| 6,238,708 | B1 | 5/2001 | Hayek et al. |
| 6,245,326 | B1 | 6/2001 | Topping et al. |
| 6,248,373 | B1 | 6/2001 | Yu et al. |
| 6,248,390 | B1 | 6/2001 | Stillman |
| 6,287,609 | B1 | 9/2001 | Marlett et al. |
| 6,387,419 | B1 | 5/2002 | Christensen |
| 6,410,079 | B2 | 6/2002 | Cheuk et al. |
| 6,426,100 | B2 | 7/2002 | Watkins et al. |
| 6,458,378 | B1 | 10/2002 | Sunvold |
| 6,630,159 | B2 | 10/2003 | Sunvold |
| 6,681,717 | B2 | 1/2004 | Burghardi et al. |
| 6,737,089 | B2 | 5/2004 | Wadsworth et al. |
| 6,746,698 | B2 | 6/2004 | Freeman |
| 6,749,872 | B2 | 6/2004 | Russell et al. |
| 6,994,869 | B1 | 2/2006 | Bird et al. |
| 2002/0156046 | A1 | 10/2002 | Raczek et al. |
| 2003/0009370 | A1 | 1/2003 | Singh et al. |
| 2003/0064104 | A1 | 4/2003 | Stillman |
| 2003/0068390 | A1 | 4/2003 | Miller et al. |
| 2003/0211201 | A1 | 11/2003 | Stillman |
| 2004/0009209 | A1 | 1/2004 | Robbins et al. |
| 2004/0037942 | A1 | 2/2004 | Shah |
| 2004/0137038 | A1 | 7/2004 | Brown et al. |
| 2004/0202697 | A1 | 10/2004 | Beauchemin et al. |
| 2004/0241257 | A1 | 12/2004 | Swain |
| 2005/0064015 | A1 | 3/2005 | Krammer et al. |
| 2005/0074442 | A1 | 4/2005 | Ranganathan |
| 2005/0084517 | A1 | 4/2005 | Torney et al. |

(Continued)

FOREIGN PATENT DOCUMENTS

| | | |
|---|---|---|
| JP | 2004321165 A2 | 11/2004 |
| WO | WO 82/02650 A1 | 8/1982 |

(Continued)

OTHER PUBLICATIONS

"Plantago Ovata (Psyllium)". Alternative Medicine Review, vol. 7, No. 2. 2002. pp. 1-5.
"Post-Foaling Care of the Mare and the Foal". Alabama Cooperative Extension System, ANR—922, reprinted Apr. 2002, available online from www.aces.edu. pp. 1-4.
"Sugar Alcohol Fact Sheet". Food Insight.org. Available online as of Sep. 2004. pp. 1-5.
"Sugar Alcohols Fact Sheet". Available online Oct. 15, 2009 from www.foodinsight.com. pp. 1-3.
Article entitled: Psyllium; obtained from Internet on Oct. 31, 2000 at http://psyllium.bestnutrition.com, (5 pages).
B. J. Impex and Marketing Flyer entitled: Psyllium Husks Powder High Fiber for a Good Diet, obtained from Internet on Oct. 31, 2000 at http://www.bjimpex.com/psyllium. (1 Page).
Chiba, Lee. "Swine Production Handbook". 12th Revision. "Section 4:Baby Pig Management (Birth to Weaning)." 2004. pp. 44-55.

(Continued)

*Primary Examiner* — Jenna A Watts
(74) *Attorney, Agent, or Firm* — Dorsey & Whitney LLP; Bridget M. Hayden

(57) ABSTRACT

A method of feeding a monogastric mammal, the method including feeding the monogastric mammal a milk replacer during a feeding period and feeding the monogastric mammal a psyllium composition during the feeding period.

17 Claims, No Drawings

(56) References Cited

U.S. PATENT DOCUMENTS

| | | |
|---|---|---|
| 2005/0100535 A1 | 5/2005 | Farmer et al. |
| 2005/0112179 A1 | 5/2005 | Khoo |
| 2005/0271788 A1 | 12/2005 | Lanter et al. |
| 2006/0057274 A1 | 3/2006 | Miller |
| 2006/0068039 A1 | 3/2006 | Agger |
| 2006/0073186 A1 | 4/2006 | Kume et al. |
| 2006/0115468 A1 | 6/2006 | Morrison |
| 2006/0134183 A1 | 6/2006 | Huetter et al. |
| 2006/0188611 A1 | 8/2006 | Unlu et al. |

FOREIGN PATENT DOCUMENTS

| | | |
|---|---|---|
| WO | WO 94/01122 A1 | 1/1994 |
| WO | WO 96/03150 A1 | 2/1996 |
| WO | WO 99/62342 A1 | 12/1999 |
| WO | WO 2004/023899 A1 | 3/2004 |
| WO | WO 2006/015018 A2 | 2/2006 |

OTHER PUBLICATIONS

Coughlan, Michael P. and Hazlewood, Geoffrey P.; Hemicellulose and Hemicellulases, pp. 1-143. (Portland Press, London and Chapel Hill), 1993.

Doyle, Peter, Selection of Supplementary Feeds, Agriculture Western Australia-Farmnote, vol. 65, pp. 1 of 6 thru 5 of 6 (1991).

Food Insight—Current Topics in Food Safety & Nutrition. Sep./Oct. 2004. pp. 1-8.

Hayden, et al. "Psyllium Improves Fecal Consistency and Prevents Enhanced Secretory Responses in Jejunal Tissues of Piglets Infected with ETEC". Digestive Diseases and Sciences, vol. 43, No. 11, Nov. 1998, pp. 2536-2541.

King, Gordon. "Animal Nutrition". Available online Feb. 22, 2004 from www.aps.uoguelph.ca. Animal & Poultry Science, University of Guelph. pp. 1-9.

Linn, J.G.,, et al., Feeding the Dairy Herd, Feeding and Nutrition, 1988, 69 pages (as obtained from the Internet).

Minutes of Eastern Expert Committee on Cereals and Oilseeds, Annual Meeting, Feb. 6-8, 2000, 49 pages (as obtained from the Internet).

New Processes for Generating Valuable Co-Products from Corn Fiber, obtained from Internet on Mar. 2, 2001 at http:/www.nal.usda.gov/tti c/biofuels/hicks.htm, pp. 1-3; Progress reports listed for Jan. 1996-Sep. 1996, Jan. 1995-Dec. 1995 and Jan. 1994 May 1994.

Professor Falke Tjerneld, Hemicellulose and Hemicellulases, Department of Biochemistry, Chemical Center, Land University (4 pages); Aug. 27, 1998.

Racz, Vernon, J., Canadian Field Peas, Nutrient Composition of Canadian Field Peas, Feed Resource Centre, Department of Animal and Poultry Science, University of Saskatchewan, 6 pages (1995).

The Merck Index, An Encyclopedia of Chemicals, Drugs, and Biologicals, Eleventh Edition, 1989, p. 733.

Upbeat on Fiber: This Oldie-But-Goodie is Back on the Dietary Hit Parade, Food Insight (4 pages) Aug. 1998.

METHOD OF FEEDING YOUNG MONOGASTRIC MAMMALS

CROSS-REFERENCE TO RELATED APPLICATIONS

This application is a Continuation of U.S. application Ser. No. 11/731,917 filed Apr. 2, 2007, issued as U.S. Pat. No. 9,420,807 on Aug. 23, 2016,the contents of which are herein incorporated by reference in its entirety.

BACKGROUND OF THE INVENTION

The present invention generally relates to methods of feeding young monogastric mammals and to compositions fed to young monogastric mammals. More particularly, the present invention relates to methods of feeding young monogastric mammals before weaning and to compositions fed to young monogastric mammals before weaning.

The economic viability of monogastric mammal production is directly related to the litters produced. In particular, litter weights at weaning and the mortality rate of the litters are important factors. For example, over the past decade or so, advances in sow feeding techniques have caused litter sizes produced by sows to generally increase. Despite these improved litter results, overall litter weights at weaning have disappointingly remained stagnant.

A larger litter weight at weaning often corresponds directly to how fast the members of the litter will grow to a marketable or market weight. Another concern is that lower weight members are more likely to die prior to weaning, as compared to their heavier brothers and sisters of the litter. For instance, lighter weight litter members are especially susceptible to hypothermia because they have a larger ratio of surface area to body weight than heavier weight litter members. Additionally, lighter weight litter members typically have only a minimal amount of reserve energy stored at birth and therefore are at an increased risk of hypoglycemia (low blood sugar) if the lighter weight litter members fail to receive adequate nourishment in the first few days following birth. Similarly, lighter weight litter members that are sick, injured, or out-competed at mealtime by heavier litter members may miss a feeding, become progressively weaker and therefore continue to miss subsequent feedings, and eventually starve to death. Thus it is increasingly important to monogastric mammal producers, such as pork producers, to assure that all members of the litter, especially those with a relatively low birth weight and most at risk of dying, receive adequate caloric intake starting at birth to maximize survival rates from each litter.

Although various feeding techniques have been proposed and/or practiced over the years and have enhanced the overall knowledge base with respect to monogastric mammal feeding, such as swine feeding, these techniques have not adequately addressed the problem of how to most economically, efficiently, and effectively increase both the survival rate of young monogastric mammals beyond weaning and young litter weights at weaning. The present invention provides a composition and method for feeding young monogastric mammals, such as piglets, before weaning that has been surprisingly found to significantly increase both feed intake by the litter and individual monogastric mammals prior to weaning while also increasing litter and young monogastric mammal weights at weaning.

BRIEF SUMMARY OF THE INVENTION

The present invention includes a method of feeding a monogastric mammal. The method includes feeding the monogastric mammal a milk replacer during a feeding period and feeding the monogastric mammal a psyllium composition during the feeding period. The present invention further includes a daily monogastric mammal ration.

DETAILED DESCRIPTION

The present invention generally relates to methods of feeding young monogastric mammals and to compositions fed to young monogastric mammals. More particularly, the present invention relates to methods of feeding young monogastric mammals before weaning and to compositions fed to young monogastric mammals before weaning. Furthermore, the present invention includes methods and compositions for increasing live litter weights at weaning, and increasing individual live monogastric mammal weights at weaning. The methods of the present invention generally entail providing young monogastric mammals with a feed composition that includes a component, such as a psyllium composition, with a substantial hemicellulose content, where the feed composition may, for example, be orally fed to the young monogastric mammals.

The methods of the present invention include feeding young monogastric mammals a fluid animal feed along with a supplemental feed material with a substantial hemicellulose content prior to weaning during a pre-weaning period. The supplemental feed material may be supplied separately from the fluid animal feed, but in various embodiments is supplied as part of the fluid animal feed to the young monogastric mammals. During the pre-weaning period, the young monogastric mammals generally may have free access to the fluid animal feed containing the supplemental feed material ad libitum, if desired, and should have free access to water ad libitum.

As used herein, the term "monogastric mammal" refers to mammals that have a stomach with only a single chamber. Monogastric mammals are different from, and therefore are distinguished from, ruminants. Ruminants are even-toed hoofed animals, such as cattle, sheep, goats, oxen, musk ox, llamas, alpacas, guanicos, deer, bison, antelopes, camels, and giraffes that have a complex 3- or 4-chamber stomach and typically re-chew what food material that has been previously swallowed. The single-chambered stomach of monogastric mammals causes digestion and nutrient assimilation to occur differently in monogastric animals, as compared to ruminants. Some non-exhaustive examples of monogastric mammals are swine, such as pigs and hogs; equine species, such as horses; humans; and various companion animals, such as hamsters, guinea pigs, gerbils, rabbits, raccoons, dogs, and cats. The present invention is believed applicable and beneficial to all monogastric mammals; therefore, the term monogastric mammal, as used herein, means all monogastric mammals, any individual example of any monogastric mammal, or any combination of different monogastric mammals.

Swine, such as pigs and hogs, are one type of monogastric mammal of interest in relation to the present invention since the research culminating in the present invention was ultimately directed at increasing production of farm-based monogastric mammals for slaughter, and swine are probably the best example of farm-based monogastric mammals that are raised for slaughter. Consequently, the present invention is generally described with reference to swine, such as pigs and hogs. Nonetheless, though the present invention is generally described in the context of swine, the present invention is believed equally applicable to any monogastric mammal, including, but not limited to swine; equine species, such as horses; humans; and companion animals, such as hamsters, guinea pigs, gerbils, rabbits, raccoons, dogs, and cats, for purposes of achieving the various benefits of the present invention.

In some embodiments of the present invention, such as those pertaining to equine species, such as horses, the monogastric mammals may weigh as much as one hundred pounds, or even two, three, or as much as four hundred pounds, when receiving the supplemental feed composition during the pre-weaning period in accordance with the present invention. In other embodiments, the monogastric mammals weigh less than 30 pounds each when receiving the supplemental feed composition during the pre-weaning period in accordance with the present invention. In still other embodiments, the monogastric mammals weigh less than 20 pounds each when receiving the supplemental feed composition during the pre-weaning period in accordance with the present invention. In many common embodiments, such as those pertaining to dogs and cats, the monogastric mammals may weigh less than 10 pounds each when receiving the supplemental feed composition during the pre-weaning period in accordance with the present invention. Finally, in embodiments pertaining to smaller monogastric mammals, such as hamsters, guinea pigs, and gerbils, the monogastric mammals may weigh less than one pound each when receiving the supplemental feed composition during the pre-weaning period in accordance with the present invention.

Weaning of young monogastric mammals occurs when the diet of the young monogastric mammals is modified, by predominantly or entirely withdrawing liquid feed from the diet of the young monogastric mammals. Thus, weaning of young monogastric mammals occurs when the diet of the young monogastric mammals is modified to predominantly, or entirely, include solid animal feed, as opposed to liquid feed such as sow's milk or fluid pig milk replacer, in the case of young piglets. Otherwise stated, young, monogastric mammals are considered to be weaned when the young, monogastric mammals are no longer allowed to nurse from any female monogastric mammal or are no longer primarily provided either natural liquid milk from any female monogastric mammal or artificial liquid milk that simulates natural liquid milk of any female monogastric mammal. For example, piglets are considered to be weaned when the piglets are no longer allowed to nurse from any sow and are not predominantly provided either natural sow's milk or an artificial sow's milk (i.e.: fluid pig milk replacer) that simulates natural sow's milk.

Correspondingly, as used herein, the term "pre-weaning period" refers to the period when nutrients are at least predominantly supplied to the young, monogastric mammals, such as piglets, in liquid form, as part of a liquid feed, and the term "post-weaning period" refers to the period when nutrients are no longer predominantly provided to young, monogastric mammals, such as the piglets, in the form of liquid feed. The pre-weaning period varies widely for different species of young monogastric mammals. For example, horses are commonly four to six months in age at weaning, while swine, such as piglets may only be a few weeks old at weaning. The present invention is believed equally applicable to any monogastric mammal, no matter the duration of the pre-weaning period. Also, some species of young monogastric mammals show greater weight gain percentages during the pre-weaning period than other species of young monogastric mammals. For example, young piglets may triple or even quadruple in weight during the first couple of weeks of the pre-weaning period, whereas dogs and cats typically do not approach that percentage of weight gain during the first couple of weeks of the pre-weaning period. Nonetheless, the present invention is believed equally applicable to any monogastric mammal, no matter what weight gain percentage the monogastric mammals experiences during the pre-weaning period or during any particular segment of the pre-weaning period.

The pre-weaning period may also be broken down into a new-born segment and a transition segment. The "new-born segment" is the time period starting at birth when only nutrients in liquid form (as the liquid feed, for example) are provided to the young monogastric mammal. The "transition segment" is the time period when the young monogastric mammal is continuing to receive liquid nutrients while also receiving gradually increasing amounts of solid feed, such as dry pig starter, to help prepare the young monogastric mammal for weaning. The transition segment (and thus also the pre-weaning period) ends, and the post-weaning period begins when the liquid feed that supplies liquid nutrients is predominantly or entirely withdrawn from the young monogastric mammal's diet and the young monogastric mammal is predominantly or entirely fed only solid feed, such as dry pig starter.

During the post-weaning period, the young monogastric mammals, such as piglets, are generally not fed any of the fluid animal feed and the young monogastric mammals are generally not fed any of the supplemental feed material in various embodiments of the present invention. If the young monogastric mammals are nonetheless fed some of the fluid animal feed and/or some of the supplemental feed material during the post-weaning period, the young monogastric mammals generally receive only an insignificant or de minimis amount of the fluid animal feed and/or less than an effective amount of the supplemental feed material. The term "effective amount of the supplemental feed material" is subsequently defined herein.

During the post-weaning period, the young monogastric mammals, such as piglets, are generally not fed any of the fluid animal feed in various embodiments of the present invention, since such feeding of fluid animal feed during the post-weaning period is presently believed unnecessary to achieve the benefits of the present invention and therefore would unnecessarily increase the cost and complexity of feeding the young monogastric mammals. Likewise, the young monogastric mammals are generally not fed any of the supplemental feed material during the post-weaning period in various embodiments of the present invention, since incorporation of the supplemental feed material during the post-weaning period is presently believed unnecessary for achieving the benefits of the present invention and therefore would unnecessarily increase the cost of feeding the young monogastric mammals.

The fluid animal feed that is provided during the pre-weaning period may generally include any fluid milk replacer that provides a level of nutrition to young monogastric mammals, such as piglets, that is sufficient to support the nutritional requirements of the piglets during the pre-weaning period. The fluid milk replacer may be liquid milk replacer, rehydrated milk replacer that is formed by rehydrating dry or powdered milk replacer, or a combination of liquid milk replacer and rehydrated milk replacer. As used herein, the term "liquid milk replacer" refers to milk replacer that is in liquid form when purchased. Often, if not predominantly, liquid milk replacer is based on dry or powdered milk replacer that has been rehydrated. As used herein, the term "rehydrated milk replacer" refers to milk replacer that is prepared as a liquid, after purchase or preparation of the dry or powdered milk replacer, by rehydrating the dry or powdered milk replacer.

The supplemental feed material that is fed to the young monogastric mammals, such as the piglets, during the pre-weaning period may generally be any material that includes a substantial amount of hemicellulose, though various embodiments of the supplemental feed material contain at least about 50 weight percent hemicellulose or even at least about 60 weight percent hemicellulose, based on the dry weight of the supplemental feed material. In fact, various embodiments of the supplemental feed material predominantly comprise hemicellulose. Hemicellulose is actually a family of branched, low molecular weight polysaccharides that are associated with cellulose and lignin in plant cell walls. Hemicellulose molecules are, as compared to cellulose molecules, highly complex molecules and are built up from several different monosaccharides, such as xylose, mannose, galactose, glucose, arabinose, and methylglucoronic acid.

One example of the supplemental feed material that comprises a suitable amount of hemicellulose is a psyllium composition that contains psyllium. Psyllium is a non-digestible, water-soluble fiber. Psyllium is sometimes employed in human and veterinary medicine due to the laxative properties of psyllium. Psyllium is derived from the seed coat or husk of psyllium seed. Psyllium seed is produced by plants of the *Plantago* genus. Various species of the *Plantago* genus are known, such as *Plantago lanceolate, Plantago rugelii,* and *Plantago major*. Some exemplary species of the *Plantago* genus that are sources of commercially available psyllium include *Plantago indica, Plantago psyllium,* and *Plantago ovata*. For example, in various embodiments, the source of the psyllium employed when practicing the present invention may be the seed from the *Plantago ovata* species, which is sometimes referred to as indian or blonde psyllium, Forskal psyllium, or Ispaghaula. Forskal psyllium has one of the highest contents of hemicellulose of the known types of psyllium. One suitable example of the psyllium composition that may be obtained from PS Fiber, Inc. of Muncie, Ind. has a purity of about 95 weight percent, based on the total dry weight of the psyllium composition, where 100 weight percent of the psyllium composition passes through a Bureau of Standards Sieve Number 100 mesh screen from the U.S. Standard Sieve Series.

The psyllium composition typically will have a purity of at least about 80 weight percent, based on the total dry weight of the psyllium composition. As used herein, the term "purity," when used in regard to the psyllium composition, refers to the concentration of psyllium in the psyllium composition. In some embodiments of the present invention, the psyllium composition may have a purity of at least about 90 weight percent, or even as high as at least about 95 weight percent, based on the total dry weight of the psyllium composition. In addition to psyllium, some forms of the psyllium composition employed when practicing the present invention contain less than about 15 weight percent light extraneous matter and less than about one percent heavy extraneous matter, based on the total dry weight of the psyllium composition. Also, in some embodiments of the present invention, the light extraneous matter and the heavy extraneous matter collectively make up less than about 10 weight percent of the psyllium composition, and even may collectively make up less than about 5 weight percent of the psyllium composition, based on the total dry weight of the psyllium composition. Light extraneous matter comprises fibrous material associated with the seed husk of the psyllium seed, and heavy extraneous matter comprises seed fragments and soil.

The psyllium composition typically may be in the form of a powder with a fine particle size to help maintain the particles of psyllium in solution when combined with water and help enhance the rate of water absorption, and the amount of water absorbed, by the psyllium. In various embodiments, the psyllium composition is ground to allow at least about 90 weight percent of the psyllium composition to pass through a Bureau of Standards Sieve Number 100 mesh screen from the U.S. Standard Sieve Series. In some embodiments, the psyllium composition is milled to allow at least about 90 weight percent, at least about 99 weight percent, and even 100 weight percent, of the psyllium composition to pass through a Bureau of Standards Sieve Number 200 mesh screen from the U.S. Standard Sieve Series. Additionally, the psyllium composition employed in various embodiments of the present invention may have a swell volume that ranges from about 49 to about 104 milliliters of water per gram of the psyllium composition, and an average swell volume ranging from about 57 to about 86 milliliters of water per gram of the psyllium composition.

Thus, psyllium is a hemicellulose source (or more properly the sole hemicellulose source) of the psyllium composition, so the psyllium composition itself may serve as the supplemental feed material. The supplemental feed material that includes the substantial amount of hemicellulose may permissibly include a hemicellulose source or sources other than, or in addition to, the psyllium composition. When the supplemental feed material includes a hemicellulose source or sources other than, or in addition to, the psyllium composition, the supplemental feed material typically will have a purity of at least about 80 weight percent, based on the total dry weight of the supplemental feed material. The term "purity," when used in relation to the supplemental feed material that includes one or more hemicellulose sources in addition to or other than psyllium, refers to the total concentration of all hemicellulose sources, collectively, in the supplemental feed material. When the supplemental feed material includes a hemicellulose source or sources other than or in addition to psyllium, the supplemental feed material may have a purity of at least about 90 weight percent, or even at least about 95 weight percent, based on the total dry weight of the supplemental feed material.

The supplemental feed material that includes a hemicellulose source or sources other than or in addition to psyllium generally may be in the form of a powder with a fine particle size to help maintain the particles of the hemicellulose source(s) in solution when combined with water and help enhance the rate of water absorption, and the amount of water absorbed, by the hemicellulose source(s). In various embodiments, the supplemental feed material that includes a hemicellulose source or sources other than or in addition to psyllium is ground to allow at least about 90 weight percent of the supplemental feed material to pass through a Bureau of Standards Sieve Number 100 mesh screen from the U.S. Standard Sieve Series. In some embodiments, the supplemental feed material that includes a hemicellulose source or sources other than or in addition to psyllium is milled to allow at least about 90 weight percent, at least about 99 weight percent, and even 100 weight percent, of the supplemental feed material to pass through a Bureau of Standards Sieve Number 200 mesh screen from the U.S. Standard Sieve Series. Additionally, the supplemental feed material that includes a hemicellulose source or sources other than or in addition to psyllium and is employed in the present invention may have a swell volume ranging from about 49 to about 104 milliliters of water per gram of the supplemental feed material, and an average swell volume ranging from about 57 to about 86 milliliters of water per gram of the supplemental feed material.

The supplemental feed material is typically provided to the young monogastric mammals, such as the piglets, as part of the fluid animal feed, though the supplemental feed material may optionally be provided separately from the fluid animal feed. The supplemental feed material, when provided as part of the fluid animal feed, may optionally be accompanied by a suspension agent to help maintain the supplemental feed material in uniform suspension within the fluid animal feed. One example of a suitable suspension agent is a blend of xanthan gum, konjac gum, and guar gum that is available as the Suspend Force HSG 200CF product from MG Force, LLC of Wayzata, Minn. Use of the Suspend Force HSG 200CF product at concentrations ranging from as low as about 0.25 weight percent to as high as about 0.275 weight percent, such as at a concentration of 0.263 weight percent, based on the total dry weight of the fluid animal feed, have proven beneficial when the concentration of the psyllium composition in the fluid animal feed ranges from about 0.75 weight percent to about 1.25 weight percent, based on the total dry weight of the fluid animal feed.

Other examples of suitable suspension agents include blends of about 50 weight percent tara gum and 50 weight percent xanthan gum, as well as, blends of modified guar gum and xanthan gum. Use of the 50/50 blend of tara gum and xanthan gum at concentrations ranging from as low as about 0.3 weight percent to as high as about 0.35 weight percent, such as at a concentration of 0.325 weight percent, based on the total dry weight of the fluid animal feed, have proven beneficial when the concentration of the psyllium composition in the fluid animal feed ranges from about 0.75 weight percent to about 1.25 weight percent, based on the total dry weight of the fluid animal feed.

The fluid animal feed primarily consists of, and in some embodiments may consist essentially of, the fluid milk replacer, the supplemental feed material, the optional suspension agent, and any optionally added antibiotic(s). The fluid milk replacer, when purchased as liquid milk replacer, may generally be any commercially available liquid milk replacer that is appropriate for young monogastric mammals, such as piglets, prior to weaning. The fluid milk replacer, when prepared from powdered or dry milk replacer, may be formulated and prepared as the rehydrated milk replacer by those responsible for feeding the young monogastric mammals, such as piglets. The fluid milk replacer may generally be prepared from any conventional powdered or dry milk replacer formulated for the young monogastric mammals, such as piglets, being fed, that is consistent with requirements or information provided herein for the fluid milk replacer. For piglets, one example of a suitable powdered milk replacer for forming rehydrated milk replacer includes any of the LitterMilk® series of powdered pig milk replacers, such as LitterMilk® NT powdered pig milk replacer, that are each available from Land O'Lakes, Inc. of Arden Hills, Minn.

The fluid milk replacer may generally include any concentration of crude protein that is appropriate for the young monogastric mammals, such as piglets, being fed. For example, some embodiments of the fluid milk replacer may contain from as little as about 16 weight percent to as much as about 35 weight percent crude protein, based on the total dry weight of the fluid milk replacer, to help optimize weight gain in the young monogastric mammals. Likewise, the fluid milk replacer may contain any concentration of fat, that is appropriate for the young monogastric mammals, such as piglets, being fed. For example, some embodiments of the fluid milk replacer may contain from as little as about 5 weight percent to as much as about 30 weight percent fat, based on the total dry weight of the fluid milk replacer, to increase the energy content of the fluid milk replacer, help reduce the incidence of scours in the young monogastric mammals, and inhibit deleterious effects of any stress the young monogastric mammals experience.

Some examples of suitable fat sources for the fluid milk replacer are edible lard; high quality vegetable fats; feed-grade tallow; grease, such as white grease or yellow grease; and hydrolyzed fat from any animal or plant source; where these exemplary fat sources may be used individually or in any combination. The fat in the fluid milk replacer may be homogenized to reduce the particle size of the fat and enhance the digestibility of the fat. One embodiment of the fluid milk replacer for use with piglets includes about 28 weight percent crude protein and about 10 weight percent fat, based on the total dry weight of the fluid milk replacer. The LitterMilk® NT powdered pig milk replacer of Land O'Lakes, Inc., when rehydrated with water, meets the specification of this particular embodiment for fluid milk replacer fed to piglets.

Piglet consumption of fluid milk replacer increases rapidly as the weight of individual piglets can increase fivefold or even more in the first three weeks after birth. Consumption of fluid milk replacer, on a dry weight basis, may generally average up to about 0.5 or about 0.6 pounds per day per piglet over the first five to six days a group of piglets receives fluid milk replacer starting a day or two after birth. Thereafter, consumption of fluid milk replacer, on a dry weight basis, may generally average up to about 0.7 or about 0.8 pounds per day per piglet over the next seven days the group of piglets receives fluid milk replacer. Continuing, consumption of fluid milk replacer, on a dry weight basis, may generally average up to about 0.9 or about 1.0 pounds per day per piglet over the next seven days the group of piglets receives fluid milk replacer if the piglets receive fluid milk replacer though this entire seven day period. Variations from these fluid milk replacer consumption rates, on a dry weight basis, may be observed in individual piglets depending upon various factors.

If dry or powdered milk replacer is used, the dry or powdered milk replacer may be rehydrated with water or any edible aqueous fluid, such as fluid milk, to form the fluid milk replacer. The concentration of the dry or powdered milk replacer in the water or aqueous fluid may be varied in any ratio, depending on the desired concentration of nutrients in the fluid milk replacer and the desired consistency of the fluid milk replacer. In some embodiments, the powdered or dry milk replacer is rehydrated in water to form fluid milk replacer having a total solids concentration ranging from as low as about 10 weight percent to as high as about 20 weight percent, based on the total weight of the fluid milk replacer. Of course, rehydrated milk replacer may also be combined with liquid milk replacer to form the fluid milk replacer. Likewise, dry or powdered milk replacer may be rehydrated by combining dry or powdered milk replacer with liquid milk replacer and, optionally, additional water and/or additional aqueous fluid.

Besides the supplemental feed material, such as the psyllium composition, the fluid animal feed may optionally also include any nutritional component. Any such optional nutritional component should be capable of remaining dissolved or in suspension in the fluid animal feed and should be compatible with other components of the fluid animal feed. Likewise, any such optional nutritional component should not disrupt digestive function of the young monogastric mammal and should not otherwise be harmful to the health of the young monogastric mammal.

Some non-exhaustive examples of optional nutritional components that are typically capable of remaining dissolved or in suspension in the fluid animal feed and that may therefore optionally be incorporated as part of the fluid animal feed include sugar(s); sugar solution(s); sugar alcohol(s); protein material(s), such as vegetable protein material(s), animal protein material(s), and marine protein material(s); bean-based or grain-based oil(s); bean-based or grain-based meal(s); bean-based or grain-based syrup(s); fatty acid(s); and any of these in any combination. Also, the fluid animal feed may optionally include any preservative, such as sorbic acid (2,4-hexadienoic acid), that is capable of remaining dissolved or in suspension in the fluid animal feed and is compatible with other components of the fluid animal feed. In some embodiments, however, the fluid animal feed primarily consists of, or even consists essentially of, the fluid milk replacer, any optionally added antibiotics, the supplemental feed material, and any optionally added suspension agent.

The fluid animal feed may include antibiotics to help preserve and enhance the respiratory and gastrointestinal health of the young monogastric mammals, such as piglets, being fed. Some non-exhaustive examples of desirable antibiotics include Neomycin and Oxytetracycline, which may be provided in some embodiments of the fluid animal feed in combination with each other in an amount and concentration that is appropriate for the young monogastric mammals, such as piglets, being fed. The LitterMilk® NT powdered pig milk replacer of Land O'Lakes, Inc. contains both Neomycin and Oxytetracycline.

As noted above, sugar alcohol may optionally be included in, or fed along with, the fluid animal feed and the supplemental feed composition. The sugar alcohol may take any form. For example, the sugar alcohol may be solid, crystalline, sugar alcohol; a sugar alcohol syrup; an aqueous mixture of water and crystalline sugar alcohol; a mixture of an edible organic solvent and crystalline sugar alcohol; an aqueous mixture of water and sugar alcohol syrup; and/or a mixture of an edible organic solvent and sugar alcohol syrup.

However, benefits achieved in accordance with the present invention are not believed to depend upon the presence of any sugar alcohol. Therefore, sugar alcohol need not be included in, or fed along with, the fluid animal feed and the supplemental feed composition. In at least some embodiments of the present invention, sugar alcohol is excluded from, and is not fed along with, the fluid animal feed and the supplemental feed composition.

As used herein, the term "sugar alcohol" means a polyhydric alcohol formed by the reduction of the carbonyl group of a sugar to a carbon atom of the sugar alcohol. Some non-exhaustive examples of sugar alcohols include adonitol; allitol; altritol (D-altritol, L-altritol, and D,L altritol); arabinitol (D-arabinitol, L-arabinitol, and D,L arabinitol); dulcitol (a.k.a. galactitol); erythritol; galaxitol; glucitol (D-glucitol, L-glucitol, and D,L glucitol); glycerol; iditol (D-iditol and L-iditol); inositol; isomalt; lactitol; maltitol; mannitol (D-mannitol, L-mannitol, and D,L mannitol); perseitol; ribitol; rhamnitol; sorbitol; threitol (D-threitol, L-threitol, and D,L threitol); and xylitol. If optionally included in, or fed along with, the fluid animal feed and the supplemental feed composition, the sugar alcohol may be any individual one of these sugar alcohols or any combination of any these or other sugar alcohols.

As noted above, preservatives, such as sorbic acid, may permissibly be included in, or fed along with, the fluid animal feed and the supplemental feed composition. However, benefits achieved in accordance with the present invention are not believed to depend upon the presence of preservative, such as sorbic acid. Therefore, sorbic acid need not necessarily be included in, or fed along with, the fluid animal feed and the supplemental feed composition. Thus, in some embodiments of the present invention, sorbic acid is not included in, and is not fed along with, the fluid animal feed and the supplemental feed composition.

The fluid animal feed may be prepared by combining the animal feed component, such as powdered or dry milk replacer, and, optionally, any other nutritional component(s). The supplemental feed material, such as the psyllium composition, may also be incorporated in the fluid animal feed, though the supplemental feed material may permissibly be fed separate from, but along with the fluid animal feed. As used herein, the term "animal feed component" generally refers, collectively, to any and all milk replacer(s), such as dry or powdered milk replacer(s), fluid milk replacer(s), liquid milk replacer(s), and/or rehydrated milk replacer(s) incorporated in the fluid animal feed.

The supplemental feed material, such as the psyllium composition, that is employed in the present invention provides beneficial results when mixed with a dry form of the animal feed component, such as powdered or dry milk replacer. For example, the supplemental feed material may be incorporated in the fluid animal feed to reduce subsequent feed preparation steps. Mixing the supplemental feed material with a dry form of the animal feed component prior to addition of water simplifies the distribution and use of the fluid animal feed. In particular, the mixture of the supplemental feed material and the dry form of the animal feed component, may be transported as a pre-mixed composition that is later combined with water (or an aqueous fluid) so the person supplying the fluid animal feed to young monogastric mammals, such as piglets, does not have to accurately mix the animal feed component and the supplemental feed material prior to feeding the fluid animal feed to the piglets.

Shortly before feeding the piglets the fluid animal feed, the mixture of the supplemental feed material and the dry form of the animal feed component may be mixed with an effective amount of water to form the fluid animal feed. As used herein, the term "effective amount of water" means an amount of water that is sufficient to provide the fluid animal feed with a texture and consistency that is similar to the texture and consistency of fluid milk. Of course, besides water, the "effective amount of water" takes into account the water content of any aqueous fluid other than, or in addition to, water that is combined with the dry form of the animal feed component.

Benefits of the present invention have been achieved when feeding piglets the fluid animal feed that incorporates the supplemental feed material on an ad libitum basis, where the piglets consume as much of the fluid animal feed that includes the supplemental feed material as they desire, on a daily basis. Based on this regimen, where the concentration of the supplemental feed material on a dry matter basis is at least about 1.1 weight percent of the fluid animal feed based on the dry weight of the fluid animal feed, it has been found that piglets allowed ad libitum basis consumption of fluid animal feed incorporating the supplemental feed material, such as the psyllium composition, exhibit (1) at least about five percent, (2) at least about ten percent, and (3) even at least about fifteen percent more daily weight gain during a one week long segment occurring during the pre-weaning period, such as, for example, anytime during the new-born segment of the pre-weaning period between about two days after birth to about seventeen days after birth, as compared to piglets allowed ad libitum basis consumption during the same one week long segment of the same fluid animal feed that is free of the supplemental feed material. Indeed, based on this regimen, where the concentration of the supplemental feed material on a dry matter basis is at least about 1.1 weight percent of the fluid animal feed based on the dry weight of the fluid animal feed, it has been found that piglets allowed ad libitum basis consumption of fluid animal feed incorporating the supplemental feed material, such as the psyllium composition, exhibit at least about 11.5 percent more daily weight gain during a two week long segment occurring during the pre-weaning period, such as, for example, anytime during the new-born segment of the pre-weaning period between about two days after birth to about seventeen days after birth, as compared to piglets allowed ad libitum basis consumption during the same two week long segment of the same fluid animal feed that is free of the supplemental feed material.

In some embodiments of the present invention where the concentration of the supplemental feed material on a dry matter basis is at least about 0.25 weight percent of the fluid animal feed based on the dry weight of the fluid animal feed, it is believed piglets allowed ad libitum basis consumption of fluid animal feed incorporating the supplemental feed material, such as the psyllium composition, will exhibit (1) at least about four percent, (2), at least about eight percent, and (3) even at least about twelve percent more daily weight gain during a one week long segment occurring during the pre-weaning period, such as, for example, anytime during the new-born segment of the pre-weaning period between about two days after birth to about seventeen days after birth, as compared to piglets allowed ad libitum basis consumption during the same one week long segment of the same fluid animal feed that is free of the supplemental feed material. Furthermore, in some in some embodiments of the present invention where the concentration of the supplemental feed material on a dry matter basis is at least about 0.25 weight percent of the fluid animal feed based on the dry weight of the fluid animal feed, it is believed piglets allowed ad libitum basis consumption of fluid animal feed incorporating the supplemental feed material, such as the psyllium composition, will exhibit (1) at least about six, (2) at least about eight, and (3) even at least about ten percent more daily weight gain during a two week long segment occurring during the pre-weaning period, such as, for example, anytime during the new-born segment of the pre-weaning period between about two days after birth to about seventeen days after birth, as compared to piglets allowed ad libitum basis consumption during the same two week long segment of the same fluid animal feed that is free of the supplemental feed material.

Another benefit of the present invention is the increased daily fluid animal feed consumption that occurs when feeding piglets the fluid animal feed that incorporates the supplemental feed material on an ad libitum basis, where the piglets consume as much of the fluid animal feed that includes the supplemental feed material as the piglets desire, on a daily basis. For example, where the concentration of the supplemental feed material on a dry matter basis is at least about 1.1 weight percent of the fluid animal feed based on the dry weight of the fluid animal feed, it has been found that piglets allowed ad libitum basis consumption of fluid animal feed incorporating the supplemental feed material, such as the psyllium composition, consume (1) at least about five percent, (2) at least about eight percent, and (3) even at least about twelve and two/thirds percent more of the fluid animal feed, on a daily basis, during a one week long segment occurring during the pre-weaning period, such as, for example, anytime during the new-born segment of the pre-weaning period between about two days after birth to about seventeen days after birth, as compared to piglets allowed ad libitum basis consumption during the same one week long segment of the same fluid animal feed that is free of the supplemental feed material. Indeed, based on this regimen, where the concentration of the supplemental feed material on a dry matter basis is at least about 1.1 weight percent of the fluid animal feed based on the dry weight of the fluid animal feed, it has been found that piglets allowed ad libitum basis consumption of fluid animal feed incorporating the supplemental feed material, such as the psyllium composition, consume at least about twelve percent more of the fluid animal feed, on a daily basis, during a two week long segment occurring during the pre-weaning period, such as, for example, anytime during the new-born segment of the pre-weaning period between about two days after birth to about seventeen days after birth, as compared to piglets allowed ad libitum basis consumption during the same two week long segment of the same fluid animal feed that is free of the supplemental feed material.

Additionally, in some embodiments of the present invention where the concentration of the supplemental feed material on a dry matter basis is at least about 0.25 weight percent of the fluid animal feed based on the dry weight of the fluid animal feed, it is believed piglets allowed ad libitum basis consumption of fluid animal feed incorporating the supplemental feed material, such as the psyllium composition, will consume (1) at least about three percent, (2) at least about six percent, (3) at least about nine percent, and (4) even at least about twelve percent more of the fluid animal feed, on a daily basis, during a one week long segment occurring during the pre-weaning period, such as, for example, anytime during the new-born segment of the pre-weaning period between about two days after birth to about seventeen days after birth, as compared to piglets allowed ad libitum basis consumption during the same one week long segment of the same fluid animal feed that is free of the supplemental feed material. Furthermore, in some embodiments of the present invention where the concentration of the supplemental feed material on a dry matter basis is at least about 0.25 weight percent of the fluid animal feed based on the dry weight of the fluid animal feed, it is believed piglets allowed ad libitum basis consumption of fluid animal feed incorporating the supplemental feed material, such as the psyllium composition, will consume (1) at least about five percent, (2) at least about eight percent, and (3) even at least about ten percent more of the fluid animal feed, on a daily basis, during a one week long segment occurring during the pre-weaning period, such as, for example, anytime during the new-born segment of the pre-weaning period between about two days after birth to about seventeen days after birth, as compared to piglets allowed ad libitum basis consumption during the same one week long segment of the same fluid animal feed that is free of the supplemental feed material.

Another benefit of the present invention is the increased overall weekly and bi-weekly weight gain, both in absolute terms and in percentage terms, that occurs when feeding piglets the fluid animal feed that incorporates the supplemental feed material on an ad libitum basis, where the piglets consume as much of the fluid animal feed that includes the supplemental feed material as the piglets desire, on a daily basis, as compared to piglets allowed ad libitum basis consumption for a comparable weekly or biweekly period of the same fluid animal feed that is free of the supplemental feed material. For example, where the concentration of the supplemental feed material on a dry matter basis is at least about 1.1 weight percent of the fluid animal feed based on the dry weight of the fluid animal feed, it has been found that piglets allowed ad libitum basis consumption of fluid animal feed incorporating the supplemental feed material, such as the psyllium composition, exhibit at least about (1) a seventy-seven and a half percent, (2) at least about an eighty-five percent, and (3) even at least about a one hundred percent increase in weight during a one week long segment occurring during the pre-weaning period, such as, for example, anytime during the new-born segment of the pre-weaning period between about two days after birth to about seventeen days after birth. Indeed, based on this regimen, where the concentration of the supplemental feed material on a dry matter basis is at least about 1.1 weight percent of the fluid animal feed based on the dry weight of the fluid animal feed, it has been found that piglets allowed ad libitum basis consumption of fluid animal feed incorporating the supplemental feed material, such as the psyllium composition, exhibit (1) at least about a 230 percent, (2) at least about a 240 percent, and (3) even at least about a 250 percent increase in weight during a two week long segment occurring during the pre-weaning period, such as, for example, anytime during the new-born segment of the pre-weaning period between about two days after birth to about seventeen days after birth.

Additionally, in some embodiments of the present invention where the concentration of the supplemental feed material on a dry matter basis is at least about 0.25 weight percent of the fluid animal feed based on the dry weight of the fluid animal feed, it is believed piglets allowed ad libitum basis consumption of fluid animal feed incorporating the supplemental feed material, such as the psyllium composition, exhibit at least about (1) a sixty percent, (2) at least about a seventy-five percent, and (3) even at least a about ninety percent increase in weight during a one week long segment occurring during the pre-weaning period, such as, for example, anytime during the new-born segment of the pre-weaning period between about two days after birth to about seventeen days after birth. Furthermore, in some embodiments of the present invention where the concentration of the supplemental feed material on a dry matter basis is at least about 0.25 weight percent of the fluid animal feed based on the dry weight of the fluid animal feed, it is believed piglets allowed ad libitum basis consumption of fluid animal feed incorporating the supplemental feed material, such as the psyllium composition, will exhibit at least about (1) a seventy-seven and a half percent, (2) at least about an eighty-five percent, and (3) even at least about a ninety-five percent increase in weight, during a one week long segment occurring during the pre-weaning period, such as, for example, anytime during the new-born segment of the pre-weaning period between about two days after birth to about seventeen days after birth.

The effective amount of the supplemental feed material, with regard to young monogastric mammals such as piglets, is defined herein as an amount of the supplemental feed material such as the psyllium composition, on a dry basis, that, when fed along with the fluid animal feed that is fed ad libitum, results in the young monogastric mammals gaining either a higher percentage of weight or a greater amount of weight, on a daily basis during the pre-weaning period over a consecutive seven or fourteen day period starting two to three days after birth, as compared to young monogastric mammals, such as piglets, allowed ad libitum basis consumption during the same one week or two week long segment of the same fluid animal feed that is free of the supplemental feed material. The concentration of the supplemental feed material such as the psyllium composition, on a dry weight basis, provided as part of or along with the fluid animal feed, may generally range from as low as about 0.25 weight percent to as high as about five weight percent, based on the dry weight of the fluid animal feed. In some embodiments, the concentration of the supplemental feed material such as the psyllium composition, on a dry weight basis, provided as part of or along with the fluid animal feed, range from as low as about 0.5 weight percent to as high as about 2.5 weight percent, based on the dry weight of the fluid animal feed.

The actual amount of the supplemental feed material, such as the psyllium composition, consumed by young monogastric mammals, such as piglets, as part of or along with the fluid animal feed during the pre-weaning period will typically vary depending on the weight and appetite of the young monogastric mammals. Indeed, as described herein, the present invention is believed equally applicable to any monogastric mammal, including, but not limited to swine; equine species, such as horses; humans; and companion animals, such as hamsters, guinea pigs, gerbils, rabbits, raccoons, dogs, and cats, for purposes of achieving the various benefits of the present invention. It is believed piglets may generally consume as little as about one half of a gram of the supplemental feed material, such as the psyllium composition, per day and up to about twenty grams of the supplemental feed material, such as the psyllium composition, per day, based on the dry weight of the supplemental feed material, though daily amounts less than about one half of a gram and greater than about twenty grams of the supplemental feed material may be consumed in accordance with the present invention while achieving benefits of the present invention. It is believed smaller young monogastric mammals, such as hamsters, guinea pigs, and gerbils, may consume as little as about one tenth of a gram of the supplemental feed material, such as the psyllium composition, per day in accordance with the present invention while achieving benefits of the present invention. On the other hand, it is believed larger young monogastric mammals, such as horses, fed in accordance with the present invention will achieve benefits of the present invention when consuming as much as fifty grams, or even more, of the supplemental feed material, such as the psyllium composition, per day.

Additionally, it is has been observed that consumption of the supplemental feed material, such as the psyllium composition, by young monogastric mammals, such as a piglets, at a rate ranging from as low as about 740 milligrams of the supplemental feed material, dry basis, per day per kilogram of young monogastric mammal to as high as about 820 milligrams of the supplemental feed material, dry basis, per day per kilogram of young monogastric mammal results in consumption of an effective amount of the supplemental feed material. It is believed consumption of the supplemental feed material, such as the psyllium composition, by young monogastric mammals, such as piglets, horses, humans, hamsters, guinea pigs, gerbils, rabbits, raccoons, dogs, and cats at a rate ranging from as low as about 500 milligrams of the supplemental feed material, dry basis, per day per kilogram of young monogastric mammal to as high as about 1000 milligrams of the supplemental feed material, dry basis, per day per kilogram of young monogastric mammal constitutes consumption of an effective amount of the supplemental feed material. Still further, it is believed consumption of the supplemental feed material, such as the psyllium composition, by any young monogastric mammal, such as a piglet, at a rate ranging from as low as about 250 milligrams of the supplemental feed material, dry basis, per day per kilogram of young monogastric mammal to as high as about 2000 milligrams of the supplemental feed material, dry basis, per day per kilogram of young monogastric mammal constitutes consumption of an effective amount of the supplemental feed material.

Though references to fluid animal feed consumption are provided in terms of ad libitum consumption of the fluid animal feed, it is to be understood that fluid animal feed consumption by young monogastric mammals, such as piglets, in accordance with the present invention may alternatively be based on a periodic feeding schedule so the young monogastric mammals consume somewhat less of the fluid animal feed than if fed the fluid animal feed ad libitum.

Any comparative weight gain details and any comparative fluid feed consumption details provided herein in relation to an individual young monogastric mammal, such as an individual piglet, are equally applicable to groups of young monogastric mammals, such as groups of piglets, unless otherwise indicated herein. Likewise, any comparative weight gain details and any comparative fluid feed consumption details provided herein in relation to a group of young monogastric mammals, such as a group of piglets, are equally applicable to an individual monogastric mammal, such as an individual piglet, unless otherwise indicated herein. Also, any comparative weight gain details and any comparative fluid feed consumption details provided herein in relation to a group of young monogastric mammals, such as a group of piglets, that consumes the fluid milk replacer in combination with the supplemental feed composition and another group of young monogastric mammals that consumes the fluid feed composition in the absence of any of the supplemental feed material are based on the groups of young monogastric mammals including the same, or about the same, number of young monogastric mammals of the same or similar species (or the same or about the same weighting of different species), and the same, or about the same, median age.

Benefits of the present invention have been achieved when feeding the fluid animal feed along with the supplemental feed composition to healthy, young, monogastric mammals, such as healthy piglets. As used herein, the term "healthy" when used with regard to young monogastric mammals, such as young piglets, means the young monogastric mammals are not exhibiting any symptoms of gastrointestinal disorders, such as diarrhea (commonly referred to as scours, when present in animals), or respiratory disorders. Nevertheless, though the feeding techniques and compositions of the present invention find benefit when used in connection with healthy young monogastric mammals, it is permissible to practice the feeding techniques of the present invention on, and employ the compositions of the present invention on, young monogastric mammals who are not healthy, such as young monogastric mammals that have a gastrointestinal or respiratory disorder, so long as use of the present feeding techniques or compositions is not contraindicated medically for the ill young monogastric mammal or mammals.

One product of the present invention may be characterized as a monogastric ration, such as a ration for a young piglet, during the pre-weaning period. The monogastric ration includes at least the animal feed component and the supplemental feed material, where the supplemental feed material and the animal feed component are typically combined with each other, as previously discussed, but may permissibly be provided to the young monogastric mammal(s) separately. Consistent with the discussions above, the concentration of the supplemental feed material may range up to about 5 weight percent (or even more) on a dry weight basis, based on the dry weight of the animal feed component. More commonly, however, the concentration of the supplemental feed material will range from as low as about 0.25 weight percent to as high as about 2.5 weight percent on a dry weight basis, based on the dry weight of the animal feed component. Another product of the present invention may be characterized as a daily ration that may be fed to young monogastric mammals during the pre-weaning period. The daily ration includes at least the animal feed component and the supplemental feed material, where the supplemental feed material and the animal feed component are typically, but not necessarily, combined with each other, as previously discussed.

Various benefits achievable when employing the methods and compositions of the present invention are described above. For example, young monogastric mammals receiving the supplemental feed material in accordance with the present invention exhibit greater amounts of weight gain, both in absolute weight gain and in percentage weight gain, during the pre-weaning period and during segments of the pre-weaning period, as compare to young monogastric mammals who do not receive the supplemental feed material. As another example, young monogastric mammals receiving the supplemental feed material in accordance with the present invention exhibit increased daily fluid animal feed consumption, during the pre-weaning period and during segments of the pre-weaning period, as compare to young monogastric mammals who do not receive the supplemental feed material.

Other benefits have been observed when employing the methods and compositions of the present invention. For example, young monogastric mammals fed employing the methods and compositions of the present invention have been found to exhibit thicker and heavier lower gut (intestine) walls than young monogastric mammals not receiving the supplemental feed material in accordance with the present invention. Also, young monogastric mammals fed employing the methods and compositions of the present invention exhibit increased lower gut volatile fatty acid production as compared to young monogastric mammals not receiving the supplemental feed material in accordance with the present invention. Furthermore, young monogastric mammals fed employing the methods and compositions of the present invention have more viscous lower gut fluid as compared to young monogastric mammals not receiving the supplemental feed material in accordance with the present invention. Each of these observations demonstrate the methods and compositions of the present invention improve lower gut health in young monogastric mammals by supporting enhanced positive microbial populations in the lower gut and generally allowing the lower gut to better address and even minimize deleterious bacterial issues arising in the lower gut of the young monogastric mammals.

Again, the present invention is believed equally applicable to any young monogastric mammal, including, but not limited to, swine; equine species, such as horses; humans;

and companion animals, such as hamsters, guinea pigs, gerbils, rabbits, raccoons, dogs, and cats. Likewise, the various benefits of the present invention are believed achievable in any young monogastric mammal fed in accordance with the present invention, including, but not limited to, swine; equine species, such as horses; humans; and companion animals, such as hamsters, guinea pigs, gerbils, rabbits, raccoons, dogs, and cats.

Various analytical techniques are employed herein. An explanation of these techniques follows. All values presented in this document for a particular parameter, such as weight percent total protein, weight percent fat, and weight percent total solids, are based on the "as is" sample and are therefore on a "wet basis", unless otherwise specified herein.

PROPERTY DETERMINATION AND CHARACTERIZATION TECHNIQUES

To determine the dry matter weight (or dry matter basis or dry basis) of a particular sample, the sample is first weighed. The weighed sample is then dried in an oven at a temperature that is adequate to drive off moisture from the sample without degrading the sample components, such as a temperature ranging from about 100° C. to about 110° C. The oven drying is continued until the weight of the dried sample remains constant, despite additional oven drying.

To determine the weight percent total solids, wet basis, in a sample, the actual weight of total solids is determined by analyzing the sample in accordance with Method #925.23 (33.2.09) of *Official Methods of Analysis*, Association of Official Analytical Chemists (AOAC) (16th Ed., 1995). The weight percent total solids, wet basis, is then calculated by dividing the actual weight of total solids by the actual weight of the sample.

To determine the weight percent total protein (crude protein), wet basis, in a sample, the actual weight of total protein is determined in accordance with Method #991.20 (33.2.11) of *Official Methods of Analysis*, Association of Official Analytical Chemists (AOAC) (16th Ed., 1995). The value determined by the above method yields "total Kjeldahl nitrogen," which is equivalent to "total protein" since the above method incorporates a factor that accounts for the average amount of nitrogen in protein. Since any and all total Kjeldahl nitrogen determinations presented herein are based on the above method, the terms "total Kjeldahl nitrogen" and "total protein" are used interchangeably herein. Furthermore, those skilled in the art will recognize that the term "total Kjeldahl nitrogen" is generally used in the art to mean "total protein" with the understanding that the factor has been applied. The weight percent total protein, wet basis, is calculated by dividing the actual weight of total protein by the actual weight of the sample.

To determine the weight percent crude fat, wet basis, in a sample, the actual weight of fat in the sample is determined in accordance with Method #974.09 (33.7.18) of *Official Methods of Analysis*, Association of Official Analytical Chemists (AOAC) (16th Ed., 1995). The weight percent fat, wet basis, is then calculated by dividing the actual weight of fat in the sample by the actual weight of the sample.

The present invention is more particularly described in the following examples which are intended as illustrations only since numerous modifications and variations within the scope of the present invention will be apparent to those skilled in the art.

EXAMPLE

The example provided below demonstrates the effect, during the pre-weaning period, of feeding monogastric mammals, generally, and piglets, specifically, a control feed in combination with the supplemental feed material of the present invention, such as the psyllium composition, as compared to the effect of feeding piglets, during the pre-weaning period, the control feed in the absence of the psyllium composition (supplemental feed material). In this Example, the control feed was a conventional pig milk replacer, namely LitterMilk® NT powdered pig milk replacer of Land O'Lakes, Inc.

In this example, twenty-four piglets (crossbred barrows) averaging two to three days of age and averaging about four pounds in weight (weights ranged from 2.7 pounds to 5.2 pounds) were assigned to one of two different treatments. The first treatment, which employed the control feed in the absence of the psyllium composition, is referred to herein as "Control," and the second treatment, which employed the control feed in combination with the psyllium composition, is referred to herein as "Psyllium Test." In this example, statistical analysis is provided for comparing the results of feeding the piglets the control feed in combination with the psyllium composition versus the results of feeding the piglets the control feed in the absence of the psyllium composition.

In this example, each piglet was weighed on the day the trial started (beginning of day 1 of the trial, when the piglets were two to three days old, on average), seven days after the trial started (end of day 7 of the trial), and fourteen days after the trial started (end of day 14 of the trial). Except as otherwise noted herein, all data provided in Tables 1-4 below is based upon individual data for each piglet, then-present, as least square means of the particular data over all piglets present in the test at the time the particular data was recorded. The data presented in Table 5 regarding the feed intake of the piglets is based on the daily fluid feed intake by the all three piglets in a particular pen; the collective daily fluid feed intake by the three pigs of a particular pen was allotted among the three piglets of the particular pen assuming each piglet of that pen had an equal feed intake to weight gain ratio for the day the fluid feed intake was measured.

Data for parameters presented in Tables 1-4 was analyzed using the general linear model (GLM) statistical procedure of SAS™ statistical analysis software for a randomized complete block design that included both the particular feed regimen and the week of the test period in the model statement. The SAS™ statistical analysis software is available from SAS Institute, Inc. of Cary, N.C. All data was analyzed to determine the mean of the data for each variable under consideration during the collection period for the particular data.

Tables 3-5 include a coefficient of variation for data in a particular row. A coefficient of variation is simply the standard deviation of a particular variable that is divided by the mean of the variable and then multiplied by 100. Because variances and standard deviations are used to measure error, and because these values for variances and standard deviations are sensitive to the absolute scale of the variable, coefficients of variations are provided, since coefficients of variation remove the influence of the overall magnitude of the data. Analysis of variance for this Example was performed using the Analysis of Variance procedure of the SAS™ statistical analysis software for the randomized complete block design that included both the particular feed regimen and the week of the test period in the model statement.

Additionally, the PDifffunction of the GLM statistical procedure was used to characterize the mean values of the data by providing for comparisons between mean data values for the piglets of the two different treatments for particular test parameters or variables. The probability value P is a measure of the statistical probability that the differing parameter values derived from (1) piglets fed the control feed in combination with the psyllium composition versus (2) piglets fed the control feed in the absence of the psyllium composition may be explained by the difference between receiving the psyllium composition and not receiving the psyllium composition.

A P value of 0.05 means that five times out of 100 the results can be explained by factors other than differences between the two different treatments. Likewise, a P value of 0.77 means that 77 times out of 100, the difference in value between the Control group fed only the control feed and the Psyllium Test group fed the control feed and the psyllium composition may be explained by factors other than the differing feeding regimens. For purposes of comparing data in this document, P values of 0.10, or lower, are considered to be statistically significant. Thus, where a P value of 0.10 or less is returned for a particular variable, it is assumed the differing results are fully explained by the test regimen, i.e.: the presence or lack of the psyllium composition in the diet of the particular piglet.

The twenty-four piglets included in this example were sorted by weight and divided into four weight groups (blocks) that each included six pigs. The pigs within each weight block were allotted into two equal subgroups (pens) of three pigs per pen. Each pen of each weight block was randomly assigned to either the Control treatment or the Psyllium Test treatment. Both pens of each of the four weight blocks were located in a swine nursery building, where the temperature was maintained at a temperature ranging from about 85° F. to about 95° F.

Each pen was equipped with a fluid milk replacer feeder so each of the three pigs in each pen had ad libitum access to either fluid control feed (Control treatment) or a combination of the fluid control feed and the psyllium composition (Psyllium Test treatment), depending on the treatment assigned to particular pens. Also, the piglets in each pen had ad libitum access to water at all times.

Each piglet included in this example received routine care and management consistent with appropriate recommendations found in the *Guide for the Care and Use of Agricultural Animals in Agricultural Research and Teaching* (1st edition, March 1988). Also, the fluid milk replacer feeder of each pen and all mixing equipment were thoroughly cleaned daily.

As noted above, the control feed in this example was LitterMilk® NT powdered pig milk replacer of Land O'Lakes, Inc. The Control treatment of this example included only the control feed, and the Psyllium Test treatment of this example included both the control feed and the psyllium composition accompanied by a suspension agent. The psyllium composition was obtained from PS Fiber, Inc. of Muncie, Ind., had a purity of about 95 weight percent, based on the total dry weight of the psyllium composition, and a 100 weight percent passage rate through a Bureau of Standards Sieve Number 100 mesh screen from the U.S. Standard Sieve Series. The suspension agent was the Suspend Force HSG 200CF product obtainable from MG Force, LLC of Wayzata, Minn. The concentration of the Suspend Force HSG 200CF product employed was about 0.275 weight percent, based on the total dry weight of the control feed, the psyllium composition, and the suspension agent.

The recipe for the amounts of dry control feed (LitterMilk® NT powdered pig milk replacer) and water to be mixed together to form the fluid control feed employed in the Control trial on the fourteen different days of the Control Trial are presented in Table 1 below. Table 1 also includes the resulting total pounds of fluid control feed, both collectively for all four of the pens assigned to the Control trial and on a per pen basis for the four different pens assigned to the Control trial. Again, Table 1 merely presents the recipe for preparation of the fluid control feed on the different days of the Control trial and does not present data for actual amounts of fluid control feed or dry control feed consumption by the piglets of the Control Trial.

TABLE 1

Fluid Control Feed Recipe (Control Trial)

| | Planned Fluid Control Feed Preparation | | | Estimated Total |
|---|---|---|---|---|
| Day of Trial | Dry Control Feed (Pounds) | Water (Pounds) | Total Pounds of Fluid Control Feed | Pounds of Fluid Control Feed Per Pen |
| Day 1 | 5.9 | 48.1 | 54.0 | 13.5 |
| Day 2 | 7.0 | 57.0 | 64.0 | 16 |
| Day 3 | 7.5 | 60.5 | 68.0 | 17 |
| Day 4 | 7.5 | 60.5 | 68.0 | 17 |
| Day 5 | 7.5 | 60.5 | 68.0 | 17 |
| Day 6 | 7.9 | 64.1 | 72.0 | 18 |
| Day 7 | 7.9 | 64.1 | 72.0 | 18 |
| Day 8 | 8.5 | 68.5 | 77.0 | 15 to 22 |
| Day 9 | 9.4 | 75.7 | 85.0 | 18 to 30 |
| Day 10 | 10.5 | 84.6 | 95.0 | 18 to 30 |
| Day 11 | 11.8 | 95.2 | 107.0 | 22 to 32 |
| Day 12 | 11.8 | 95.2 | 107.0 | 22 to 32 |
| Day 13 | 11.8 | 95.2 | 107.0 | 22 to 32 |
| Day 14 | 11.8 | 95.2 | 107.0 | 22 to 32 |

The total pounds of fluid control feed consumed by the piglets of the Control trial on any particular day of the trial may have been somewhat more or somewhat less than the total pounds of fluid control feed shown for that day in Table 1. If more of the fluid control feed than shown in the recipe of Table 1 for a particular day was required, the additional amount prepared followed the dry control feed to water ratio represented in Table 1 for that particular day. Also, the total pounds of fluid control feed consumed by the piglets in a particular pen of the Control trial on any particular day of the trial may have been somewhat more or somewhat less than the estimated total pounds of fluid control feed per pen shown for that day in Table 1. On each day of the Control trial, the fluid control feed was distributed between the four different pens assigned to the Control trial so none of the pens ever ran out of the fluid control feed; this assured that each piglet of each different pen assigned to the Control trial always had ad libitum access to the fluid control feed on each day of the Control trial.

The recipe for the Psyllium Test feed for the different days of the Psyllium Test is provided in Table 2 below. Preparation of the Psyllium Test feed merely involved addition of psyllium, in powdered form, along with the suspension agent to the fluid control feed employed in the Control trial. Table 2 includes the total pounds of Psyllium Test feed to be prepared daily, both collectively for all four of the pens assigned to the Psyllium Test and on a per pen basis for the four different pens assigned to the Psyllium Test. Again, Table 2 merely presents the recipe for preparation of the Psyllium Test feed on the different days of the Psyllium Test and does not present data for actual amounts of Psyllium Test feed or dry Psyllium Test feed consumption by the piglets of the Psyllium Test.

TABLE 2

Psyllium Test Feed Recipe (Control Trial)

| Day of Trial | Planned Fluid Control Feed Preparation ||| Added To Fluid Control Feed To Form Psyllium Test Feed || Estimated Total Pounds of Psyllium Test Feed Per Pen |
|---|---|---|---|---|---|---|
| | Dry Control Feed (Pounds) | Water (Pounds) | Total Pounds of Fluid Control Feed | Psyllium (Grams) | Suspension Agent (Grams) | |
| Day 1  | 5.9  | 48.1 | 54.0  | 29.7 | 7.1  | 13.5     |
| Day 2  | 7.0  | 57.0 | 64.0  | 35.2 | 8.4  | 16       |
| Day 3  | 7.5  | 60.5 | 68.0  | 37.4 | 8.9  | 17       |
| Day 4  | 7.5  | 60.5 | 68.0  | 39.6 | 9.5  | 17       |
| Day 5  | 7.5  | 60.5 | 68.0  | 39.6 | 9.5  | 17       |
| Day 6  | 7.9  | 64.1 | 72.0  | 39.6 | 9.5  | 18       |
| Day 7  | 7.9  | 64.1 | 72.0  | 42.3 | 10.1 | 18       |
| Day 8  | 8.5  | 68.5 | 77.0  | 42.3 | 10.1 | 15 to 22 |
| Day 9  | 9.4  | 75.7 | 85.0  | 46.7 | 11.2 | 18 to 30 |
| Day 10 | 10.5 | 84.6 | 95.0  | 52.2 | 12.5 | 18 to 30 |
| Day 11 | 11.8 | 95.2 | 107.0 | 58.8 | 14.1 | 22 to 32 |
| Day 12 | 11.8 | 95.2 | 107.0 | 58.8 | 14.1 | 22 to 32 |
| Day 13 | 11.8 | 95.2 | 107.0 | 58.8 | 14.1 | 22 to 32 |
| Day 14 | 11.8 | 95.2 | 107.0 | 58.8 | 14.1 | 22 to 32 |

The total pounds of fluid control feed consumed by the piglets of the Control trial on any particular day of the trial may have been somewhat more or somewhat less than the total pounds of fluid control feed shown for that day in Table 1. If more of the fluid control feed than shown in the recipe of Table 1 for a particular day was required, the additional amount prepared followed the dry control feed to water ratio represented in Table 1 for that particular day. Also, the total pounds of fluid control feed piglets consumed in a particular pen of the Control trial on any particular day of the trial may have been somewhat more or somewhat less than the estimated total pounds of fluid control feed per pen shown for that day in Table 1. On each day of the Control trial, the fluid control feed was distributed between the four different pens assigned to the Control trial so none of the pens ever ran out of the fluid control feed; this assured that each piglet of each different pen assigned to the Control trial always had ad libitum access to the fluid control feed on each day of the Control trial.

For those piglets in pens allotted to the Control trial, daily fluid control feed intake by the piglets was measured for each pen and allotted among the three piglets of a particular pen assuming each piglet of that pen had an equal feed intake to weight gain ratio for the day the fluid control feed intake was measured. Likewise, for those piglets in pens allotted to the Psyllium Test trial, daily Psyllium Test feed (fluid control feed plus psyllium and suspension agent) intake was measured for each pen and allotted among the three piglets of a particular pen assuming each piglet of that pen had an equal feed intake to weight gain ratio for the day the Psyllium Test feed intake of the Psyllium Test trial was measured.

Performance observations for the piglets of the Control trial and for the piglets of the Psyllium Test treatment are provided in Tables 3, 4, and 5 below. This data indicates piglets, when provided with ad libitum volumes of the same fluid pig milk replacer, consumed significantly more fluid pig milk replacer and gained significantly more weight when the piglets also consumed a small amount of psyllium along with the fluid pig milk replacer.

TABLE 3

Piglet Weight Measurements

| Day of trial | Average Piglet Weight (Pounds) || C.V. | P Value |
|---|---|---|---|---|
| | Control | Psyllium Test | | |
| 0*  | 4.02  | 3.98  | 17.08 | 0.906 |
| 7*  | 7.48  | 7.96  | 15.46 | 0.332 |
| 14* | 13.12 | 14.13 | 12.83 | 0.172 |

*Weight measurements for Day 0 were made at the beginning of Day 0, and weight measurements for Days 7 and 14 were taken at the end of Days 7 and 14.

TABLE 4

Piglet Daily Weight Gain

| Time Period | Average Daily Weight Gain Per Piglet (Pounds) || C.V. | P Value | Percent Increase |
|---|---|---|---|---|---|
| | Control | Psyllium Test | | | |
| Week 1*     | 0.494 | 0.568 | 18.68 | 0.081 | 14.98% |
| Week 2*     | 0.806 | 0.881 | 11.74 | 0.077 | 9.31%  |
| Weeks 1 + 2 | 0.650 | 0.725 | 12.22 | 0.041 | 11.54% |

*Week 1 extended from the beginning of Day 0 to the end of Day 7, and Week 2 extended from the end of Day 7 to the end of Day 14.

TABLE 5

Piglet Daily Feed Intake

| Time Period | Average Daily Feed Intake† Per Piglet (Pounds) || C.V. | P Value | Percent Increase |
|---|---|---|---|---|---|
| | Control | Psyllium Test | | | |
| Week 1*     | 0.371 | 0.403 | 24.26 | 0.408 | 8.62%  |
| Week 2*     | 0.734 | 0.827 | 13.10 | 0.036 | 12.67% |
| Weeks 1 + 2 | 0.552 | 0.615 | 14.23 | 0.078 | 11.41% |

*Week 1 extended from the beginning of Day 0 to the end of Day 7, and Week 2 extended from the end of Day 7 to the end of Day 14.
†Based on the dry matter weight of the feed consumed, including the dry weight of the control feed, the dry weight of the psyllium composition and the dry weight of the suspension agent The data presented in Tables 4 and 5 illustrates the piglets receiving the psyllium gained nearly 15% more weight (P=0.081) during the first week of the study than the piglets not receiving the psyllium, while consuming slightly more (P=0.408) of the fluid control feed than the piglets not receiving the psyllium. Also, the data of Tables 4 and 5 illustrates the piglets receiving the psyllium consumed 12.67% more (P=0.036) of the fluid control feed during the second week of the study than the piglets not receiving the psyllium and gained more than nine percent more weight than the piglets not receiving the psyllium. Overall, for the two week period of the study, the piglets receiving the psyllium gained significantly more (11.54% @P=0.041) weight and consumed significantly more of the fluid control feed (11.41% @P=0.078) than the piglets not receiving the psyllium.

Although the present invention has been described with reference to preferred embodiments, workers skilled in the art will recognize that changes may be made in form and detail without departing from the spirit and scope of the invention.

The invention claimed is:

1. A method of feeding a healthy non-human monogastric mammal, the method comprising:
   orally feeding the healthy non-human monogastric mammal a fluid animal feed during a pre-weaning period, the fluid animal feed comprising a fluid milk replacer and a supplemental feed material in which the supplemental feed material comprises at least about 50 weight percent hemicellulose based on the dry weight of the supplemental feed material,
   the fluid animal feed being free of sugar alcohol.

2. The method of claim 1, a source of the hemicellulose comprising psyllium.

3. The method of claim 1, the healthy monogastric mammal being an equine animal.

4. The method of claim 1, the healthy monogastric mammal being a piglet.

5. The method of claim 4, the supplemental feed material in an amount of at least about 1.1 weight percent based on the dry weight of the fluid animal feed.

6. The method of claim 5, the method effective to increase a rate of weight gain by the piglet compared to other piglets not fed a fluid animal feed comprising the supplemental feed material in an amount of at least about 1.1 weight percent based on the dry weight of the fluid animal feed.

7. The method of claim 4, the supplemental feed material in an amount of at least about 0.25 weight percent based on the dry weight of the fluid animal feed.

8. The method of claim 7, the method effective to one or more of: increase a rate of weight gain by the piglet or increase consumption of the fluid animal feed by the piglet compared to other piglets not fed a fluid animal feed comprising the supplemental feed material in an amount of at least about 0.25 weight percent based on the dry weight of the fluid animal feed.

9. The method of claim 4, the piglet weighing less than 30 pounds when receiving the supplemental feed material.

10. The method of claim 1, the healthy monogastric mammal consuming at least about 500 milligrams of the supplemental feed material per kilogram of the healthy monogastric mammal per day.

11. The method of claim 1, the healthy monogastric mammal consuming about 1000 milligrams, or less, of the supplemental feed material per kilogram of the healthy monogastric mammal per day.

12. The method of claim 1, the supplemental feed material being present in an amount from about 0.25 weight percent to about 5 weight percent based on the dry weight of the fluid animal feed.

13. The method of claim 1, the supplemental feed material being present in an amount from about 0.5 weight percent to about 2.5 weight percent based on the dry weight of the fluid animal feed.

14. The method of claim 1, the feeding being ad libitum.

15. The method of claim 1, the supplemental feed material comprising a powder such that at least about 90 weight percent of the supplemental feed material passes through a 100 mesh screen.

16. A method of feeding a healthy non-human monogastric mammal, the method comprising:
   orally feeding the healthy non-human monogastric mammal a fluid animal feed, the fluid animal feed comprising a supplemental feed material and a suspension agent, the supplemental feed material comprising at least about 50 weight percent hemicellulose based on the dry weight of the supplemental feed material, the fluid animal feed being free of sugar alcohol.

17. The method of claim 16, a source of the hemicellulose comprising psyllium.

* * * * *